(12) United States Patent
Atanassova et al.

(10) Patent No.: US 9,112,231 B2
(45) Date of Patent: Aug. 18, 2015

(54) LEAD-ACID BATTERIES AND PASTES THEREFOR

(75) Inventors: Paolina Atanassova, Albuquerque, NM (US); Berislav Blizanac, Albuquerque, NM (US); Toivo Kodas, Carlisle, MA (US); Mark Hampden-Smith, Albuquerque, NM (US); Miodrag Oljaca, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 203 days.

(21) Appl. No.: 13/289,473

(22) Filed: Nov. 4, 2011

(65) Prior Publication Data

US 2012/0115031 A1  May 10, 2012

Related U.S. Application Data

(60) Provisional application No. 61/410,378, filed on Nov. 5, 2010.

(51) Int. Cl.
| | |
|---|---|
| *H01M 4/14* | (2006.01) |
| *H01M 4/62* | (2006.01) |
| *H01M 4/20* | (2006.01) |
| *H01M 10/12* | (2006.01) |
| *H01M 10/42* | (2006.01) |
| *H01M 4/02* | (2006.01) |

(52) U.S. Cl.
CPC ............. *H01M 4/625* (2013.01); *H01M 4/14* (2013.01); *H01M 4/20* (2013.01); *H01M 10/121* (2013.01); *H01M 10/4235* (2013.01); *H01M 2004/027* (2013.01); *Y02E 60/126* (2013.01)

(58) Field of Classification Search
None
See application file for complete search history.

(56) References Cited

U.S. PATENT DOCUMENTS

| | | | |
|---|---|---|---|
| 5,885,335 | A | 3/1999 | Adams et al. |
| 6,338,809 | B1 | 1/2002 | Hampden-Smith et al. |
| 6,601,776 | B1 | 8/2003 | Oljaca et al. |
| 6,733,547 | B2 | 5/2004 | Ma |
| 7,033,703 | B2 | 4/2006 | Kelley et al. |
| 7,083,876 | B2 | 8/2006 | Honbo et al. |
| 7,105,252 | B2 | 9/2006 | Kelley et al. |
| 7,341,806 | B2 | 3/2008 | Kelley et al. |
| 2002/0009638 | A1 | 1/2002 | Dattilo et al. |
| 2003/0031856 | A1* | 2/2003 | Hareyama et al. ......... 428/313.3 |
| 2003/0049528 | A1 | 3/2003 | Honbo et al. |
| 2003/0106205 | A1 | 6/2003 | Ma |
| 2003/0219653 | A1 | 11/2003 | Kelley et al. |
| 2004/0180264 | A1 | 9/2004 | Honbo et al. |
| 2005/0214644 | A1* | 9/2005 | Aramata et al. .......... 429/218.1 |
| 2006/0068294 | A1 | 3/2006 | Mraz et al. |
| 2006/0165876 | A1 | 7/2006 | Gyenge et al. |

(Continued)

FOREIGN PATENT DOCUMENTS

| | | |
|---|---|---|
| GB | 921688 | 3/1963 |
| JP | 09147841 A * | 6/1997 |

(Continued)

OTHER PUBLICATIONS

JP09147841A Machine English Translation.*

(Continued)

*Primary Examiner* — Patrick Ryan
*Assistant Examiner* — Lucas J O'Donnell

(57) ABSTRACT

A paste suitable for a negative plate of a lead-acid battery comprises lead oxide and composite particles comprising carbon and silica.

15 Claims, 4 Drawing Sheets

(56) References Cited

U.S. PATENT DOCUMENTS

| | | |
|---|---|---|
| 2006/0166098 A1* | 7/2006 | Tabuchi et al. ............... 429/232 |
| 2006/0263692 A1 | 11/2006 | Kelley et al. |
| 2007/0141472 A1 | 6/2007 | Lin |
| 2008/0003501 A1 | 1/2008 | Vincze et al. |
| 2008/0305396 A1 | 12/2008 | Boden |
| 2009/0130549 A1 | 5/2009 | Kelley et al. |
| 2009/0325068 A1 | 12/2009 | Boden et al. |
| 2010/0015531 A1 | 1/2010 | Dickinson et al. |
| 2010/0051857 A1* | 3/2010 | Takakusa et al. .......... 252/182.1 |
| 2011/0083966 A1 | 4/2011 | Kirchev |

FOREIGN PATENT DOCUMENTS

| | | |
|---|---|---|
| JP | 2002367613 | 12/2002 |
| TW | 201029250 A1 | 8/2010 |

OTHER PUBLICATIONS

EN Translation JP09-147841A.*

International Search Report and Written Opinion for International Application No. PCT/US2011/059346 mailed Feb. 3, 2012.

Pavlov et al. "Mechanism of action of electrochemically active carbons on the processes that take place at the negative plates of lead-acid batteries", Journal of Power Sources, 191 (2009), 58-75.

Lambert et al. "Advances in gelled-electrolyte technology for valve-regulated lead-acid batteries", Journal of Power Sources, 107 (2002), 173-179.

* cited by examiner

LEAD-ACID BATTERIES AND PASTES THEREFOR

CROSS REFERENCE TO RELATED APPLICATIONS

This application claims the benefit of the filing date of U.S. Provisional Application No. 61/410,378 filed Nov. 5, 2010, the entire contents of which are incorporated herein by reference.

FIELD

The present invention relates to lead-acid batteries and pastes for use in forming lead-acid battery plates, particularly negative lead-acid battery plates.

BACKGROUND

The lead-acid battery is an electrochemical storage battery generally comprising a positive plate, a negative plate, and an electrolyte comprising aqueous sulfuric acid. The plates are held in a parallel orientation and electrically isolated by porous separators to allow free movement of charged ions. The positive battery plates contain a current collector (i.e., a metal plate or grid) covered with a layer of positive, electrically conductive lead dioxide ($PbO_2$) on the surface. The negative battery plates contain a current collector covered with a negative, active material, which is typically lead (Pb) metal.

During discharge cycles, lead metal (Pb) supplied by the negative plate reacts with the ionized sulfuric acid electrolyte to form lead sulfate ($PbSO_4$) on the surface of the negative plate, while the $PbO_2$ located on the positive plate is converted into $PbSO_4$ on or near the positive plate. During charging cycles (via an electron supply from an external electrical current), $PbSO_4$ on the surface of the negative plate is converted back to Pb metal, and $PbSO_4$ on the surface of the positive plate is converted back to $PbO_2$. In effect, a charging cycle converts $PbSO_4$ into Pb metal and $PbO_2$; a discharge cycle releases the stored electrical potential by converting $PbO_2$ and Pb metal back into $PbSO_4$.

Lead-acid batteries are currently produced in flooded cell and valve regulated configurations. In flooded cell batteries, the electrodes/plates are immersed in electrolyte and gases created during charging are vented to the atmosphere. Valve regulated lead-acid batteries (VRLA) include a one-way valve which prevents external gases entering the battery but allows internal gases, such as oxygen generated during charging, to escape if internal pressure exceeds a certain threshold. In VRLA batteries, the electrolyte is normally immobilized either by absorption of the electrolyte into a glass mat separator or by gelling the sulfuric acid with silica particles.

One major problem with existing lead-acid batteries is their low cycleability at high rate charge/discharge conditions required for advanced applications such as hybrid electric vehicles and distributed storage. The main failure mode in these operating conditions is called "negative plate sulfation", which is a term used to describe the phenomenon of kinetically irreversible formation of lead sulfate ($PbSO_4$) crystallites. Ideally during each charge/discharge cycle all the lead sulfate on the negative plate is reversibly converted to lead and then back to lead sulfate. However, in reality this is not the case and during each cycle more and more lead sulfate is irreversibly formed in the negative plate. The formation of increased amounts of lead sulfate leads to several undesirable effects: the conductivity and porosity of the plate is decreased, the accessibility of sulfuric acid to the active phase is hindered and less Pb is available to participate in the discharge process, all this in combination leading to failure of the battery to deliver the required voltage and power. This phenomenon is especially pronounced when fast charge/discharge rates are used.

One known method for reducing the problem of "negative plate sulfation" is to add carbon to the paste used to produce the negative plate, generally as part of an expander formulation comprising barium sulfate, carbon, and a lignosulfonate or other organic material. The carbon increases the electrical conductivity of the active material in the discharged state thereby improving its charge acceptance. An example of such an approach is discussed in "Mechanism of action of electrochemically active carbons on the processes that take place at the negative plates of lead-acid batteries", Pavlov et al, *Journal of Power Sources*, 191, 2009, 58-75, in which the effect of adding different forms of carbon at varying levels between 0.2 to 2% by weight of the negative plate paste is studied. The carbon materials investigated are NORIT AZO activated carbon and the carbon blacks VULCAN XC72R, Black Pearls 2000 and PRINTEX® XE2.

Carbon as an additive has been proven to enable high dynamic charge acceptance and improved cycle life of both flooded and VRLA lead-acid batteries. Addition of carbon to the negative plate changes the morphology of the plate, affects the chemical processes of lead sulfate-lead transformations and thus slows down the process of negative plate sulfation in parallel to improving the charge acceptance characteristics of the battery. Carbon blacks are among several types of carbons studied, along with graphite and activated carbons, and have been demonstrated to offer the most promising results in improved cycleability and charge acceptance. Unlike graphite and activated carbons, carbon blacks consist of submicron aggregates comprised of nm size primary particles. This allows for increased conductivity of the negative plate and for high accessibility of their surface area. Carbon black loadings up to 3 wt. % (alone or in combination with other carbons) have been tested in VRLA and flooded batteries (see, for example, U.S. Patent Application Publication No. 2009/0325068). Higher loadings of high surface area carbons are desirable but there are several challenges in the manufacture of the negative plates when high carbon loadings are targeted. Thus, high loadings of carbon require higher amounts of water to be added to the paste and lead to decreased viscosity and problems with pasting the electrodes over the grid. In addition, during cycling, some of the carbon can "shed off" the electrodes and ultimately negatively affect the cycle life of the battery.

Although carbon addition assists in increasing the electrical conductivity of the negative plate in its discharged state, it does not address another issue associated with sulfation and that is the accessibility of the sulfuric acid electrolyte to the active material. Thus, lack of uniform and controlled distribution of sulfuric acid within the negative plate electrode has been identified as one of the main contributing factors to sulfation, particularly with flooded cell batteries.

According to the invention, both the problems of reduced electrical conductivity and sulfuric acid access are addressed by adding a composite particle comprising carbon and silica to the negative plate paste. The carbon acts to improve the electrical conductivity of the active material, while the presence of silica in the composite particle will act as "glue" holding the carbon particles in aggregates which have controlled porosity and stability during the cycling process. In flooded type lead acid batteries the composite carbon silica particle will also assist in minimizing the acid stratification issue observed during cycling due to partial gelling of the electrolyte. Thus the addition of composite carbon-silica particles to the negative electrode of flooded batteries enables formation of an electrode structure where at least partially the sulfuric acid electrolyte is immobilized onto the electrode and issues with acid accessibility and stratification are significantly improved.

U.S. Patent Application Publication No. 2004/0180264 discloses a lead-acid battery comprising a cathode, an anode and an electrolytic solution, wherein into the anode is added an active carbon or a carbon black or a mixture thereof containing at least one simple substance selected from the group consisting of Hf, Nb, Ta, W, Ag, Zn, Ni, Si, Mg, Al, Co, Mo, Cu, V, Mn, Ba, K, Cs, Rb, Sr and Na, or at least one compound thereof. The disclosed battery containing carbon with the above additives as impurities in 10-5000 ppm concentration levels has improved high efficiency charging characteristics. In addition, an anode containing an activated carbon produced from coconut husk containing up to 15,000 ppm of natural impurities (Cu, Mn, Al, Si and K) is stated to improve the high efficiency charging characteristics and charge acceptance. For all examples the loading of the additive metal substance to the carbon does not exceed 15,000 ppm or 1.5 wt. %.

SUMMARY

Accordingly, the invention resides in one aspect, in a paste suitable for a negative plate of a lead-acid battery, the paste comprising lead oxide and composite particles comprising carbon and silica.

Conveniently, the loading of said composite particles is from about 0.2 to about 25 wt %, such as from about 0.5 to about 10 wt %, for example from about 1 to about 7 wt. % relative to the lead oxide.

Conveniently, weight ratio of carbon to silica in said composite particles is from about 98:2 to about 50:50, such as from 95:5 to 50:50.

In one embodiment, the composite particles comprise micron size agglomerates comprised of carbon and silica submicron aggregates.

Optionally, the carbon comprises carbon black and especially carbon black that has been modified to comprise surface sulfate, sulfite, sulfonate or carboxylic acid groups.

Conveniently, the composite particles comprise agglomerates having an average size between about 0.2 and about 10 microns.

In one embodiment, the composite particles comprise at least one of barium sulfate and a lignosulfonate.

In further aspects, the invention resides in a negative plate for a lead-acid battery and a lead-acid battery comprising the paste described herein.

DETAILED DESCRIPTION OF THE EMBODIMENTS

Figure 1:
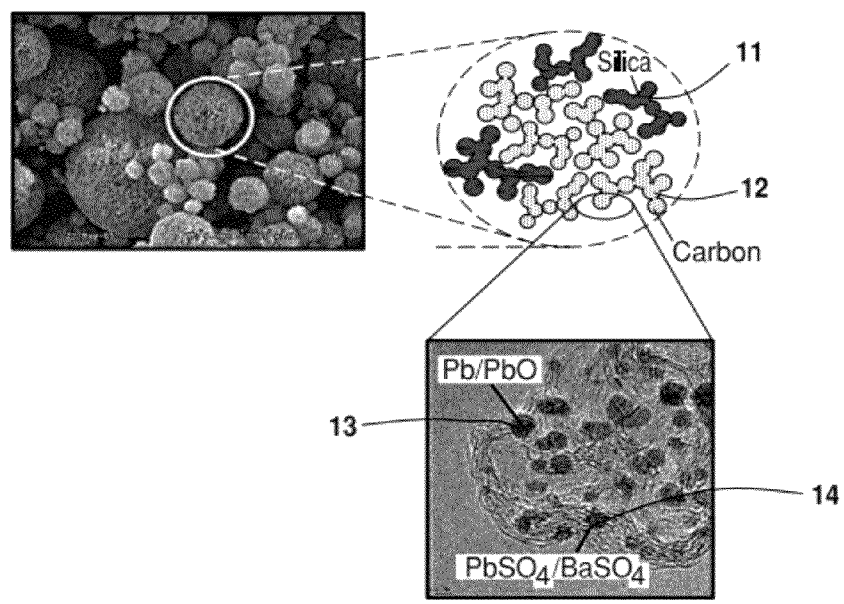
FIG. 1 is an illustration of a spherical silica-carbon composite particle comprising submicron aggregates of silica and carbon.

The manufacture of battery plates for lead-acid batteries generally involves a paste mixing, curing and drying operation in which the active materials of the battery paste undergo chemical and physical changes that are used to establish the chemical and physical structure and subsequent mechanical strength necessary to form the battery plate. To produce typical battery plates, lead oxide, water and sulfuric acid are added to a commercial paste mixing machine and are then mixed to the desired consistency. Depending on whether negative or positive plates for the batteries are being produced, conventional additives such as a flock or expander may also be used to modify the properties of the paste and the performance of the plates produced. Other known additives may be used to improve the chemical and physical structure and performance of the battery plates.

The negative plates of lead-acid batteries are usually produced by preparing a paste with an expander mixture and then applying this battery paste to electrically conducting lead alloy structures known as grids to produce plates. Typically, these pasted plates are then cured in heated chambers containing air with a high relative humidity. This curing process produces the necessary chemical and physical structure required for subsequent handling and performance in the battery. Following curing, the plates are dried using any suitable means. These plates, comprising negative active material, are then suitable for use in the battery.

The expander, which is usually a mixture of barium sulfate, carbon, and a lignosulfonate or other organic material, is added to the negative plate active material during preparation of the paste. The expander may also incorporate other known ingredients to improve the performance of the battery. The expander materials can be added separately to the paste during the paste mixing process, but an improved procedure is to mix the constituent materials of the expander before adding them to the paste mix.

The expander mixture performs a number of functions in the negative plate. For example, the barium sulfate acts as a nucleating agent for lead sulfate produced when the plate is discharged as follows:

$$Pb \rightarrow Pb^{2+} + 2e$$

$$Pb^{2+} + SO_4^{2-} \rightarrow PbSO_4$$

The lead sulfate discharge product deposits on the barium sulfate particles assuring homogeneous distribution throughout the active material and preventing coating of the lead particles. The term barium sulfate represents both blanc fixe and barytes forms of this compound and mixtures thereof in particle sizes from 0.5 to 5 micrometers. It is desirable that the barium sulfate crystals have a very small particle size, of the order of 1 micron or less, so that a very large number of small seed crystals are implanted in the negative active material. This ensures that the lead sulfate crystals, which are growing on the barium sulfate nuclei, are small and of a uniform size so that they are easily converted to lead active material when the plate is charged as follows:

$$PbSO_4 \rightarrow Pb^{2+} + SO_4^{2-}$$

$$Pb^{2+} + 2e \rightarrow Pb$$

The function of the lignosulfonate is more complex. It is chemically adsorbed on the lead active material resulting in a significant increase in its surface area. Without lignosulfonate, the surface area is of the order of approximately 0.2 square meters per gram while, with 0.50% of lignosulfonate, this is increased to approximately 2 square meters per gram. This high surface area increases the efficiency of the electrochemical process which improves the performance of the negative plate. The lignosulfonate also stabilizes the physical structure of the negative active material, which retards degradation during operation of the battery. This property increases the life of the battery in service. The organic material can be any lignosulfonate compound or other suitable organic material that can be adsorbed on the surface of the negative active material and thereby affect its surface area and electrochemical behavior.

The carbon in the expander mixture increases the electrical conductivity of the active material in the discharged state, which improves its charge acceptance. The carbon is usually in the form of graphite, carbon black and/or activated carbon. The amount of carbon in conventional expander formulations is only a small fraction of a percent.

In the negative plate paste disclosed herein, the conventional carbon in the expander mixture is replaced with composite particles of carbon and silica. These composite particles can be individual particles, each containing both carbon and silica, in which case the primary particles typically have an average size of between about 10 to about 20 nm and grouped in aggregates with an average size between 50 and 500 nm. Alternatively, as shown in FIG. 1, the composite particles can be in the form of agglomerates of carbon aggregate particles 11 and silica aggregate particles 12 adhered together and, depending on the state of charge of the plate, interspersed with particles 13 containing lead and/or particles 14 containing lead sulfate and barium sulfate. The average size of the agglomerates is between about 0.2 and 10 microns.

The weight ratio of carbon to silica in the composite particles is generally from about 98:2 to about 50:50, such as from about 95:5 to about 50:50, such as from about 90:10 to about 75:25. In this respect, it will be appreciated that the amount of silica present in the composite particles is significantly in excess of that inherently present in the carbon (activated carbons) or produced as a result of possible silicon impurities in the carbon or carbon precursor.

Where the composite particles are in the form of individual particles containing both carbon and silica, the silica is preferably present as a coating (either a continuous coating or discrete particles) on the carbon particles. Such composite materials are commercially available from Cabot Corporation as carbon-silica dual phase fillers.

Generally, the loading of the carbon and silica composite particles in the negative battery plate paste is from about 0.2 to about 25 wt %, such as about 0.5 to about 10 wt %, and especially between about 1 and about 7 wt %, relative to the lead oxide in the paste. By adding these composite particles to the battery paste, not only is the electrical conductivity of the paste improved by the carbon in the particles, but also the silica acts as a reservoir for the sulfuric acid electrolyte to provide increased uniformity and accessibility of the electrolyte to the Pb/$PbSO_4$ active sites. This is particularly important in flooded cell batteries, where the silica acts to partially gel the electrolyte to reduce problems of acid stratification. Moreover, the presence of silica provides mechanical stability to the composite particle and prevents shedding of carbon during preparation and cycling of the negative electrode.

Figure 2:
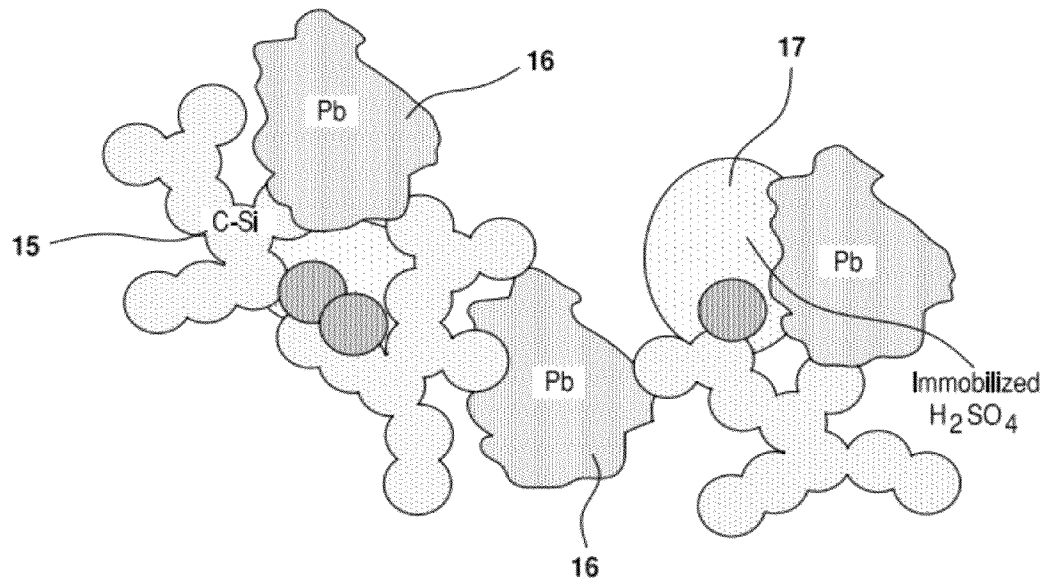
FIG. 2 is an illustration of composite silica-carbon particles in use in a lead-acid battery.

The operation of the present carbon and silica composite particles when in use in a lead-acid battery is illustrated in FIG. 2. In FIG. 2, the carbon-silica composite particles are shown at 15, lead particles are shown at 16 and sulfuric acid electrolyte is shown at 17. The carbon-silica composite particles 15 form a three-dimensional nano-grid having mechanical stability and engineered porosity and pore size. The silica containing part of the nano-grid immobilizes and acts as a reservoir for the sulfuric acid electrolyte ensuring acid distribution uniformity and eliminating the concentration gradients. Although not fully understood, it is believed that the silica domains of the composite particles react with the sulfuric acid electrolyte so that, upon drying and formation of the electrodes, siloxane bridges are produced between the silica domains resulting in the formation of an interconnected grid of composite particles with controlled porosity and increased mechanical integrity. The carbon black part of the nano-grid serves as an electrical conduction pathway (in addition to the Pb active phase) and provides additional surface area for $PbSO_4$ precipitation thus preventing $PbSO_4$ precipitation onto the Pb-active phase 12 and hence reduced Pb-utilization.

Figure 3:
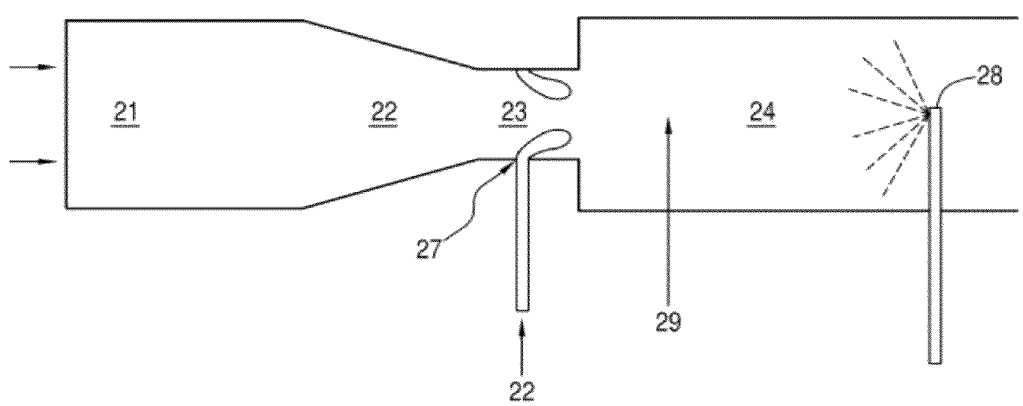
FIG. 3 is a cross-sectional view of a portion of a furnace carbon black reactor which may be utilized to produce silica-coated composite carbon particles.
Figure 4:
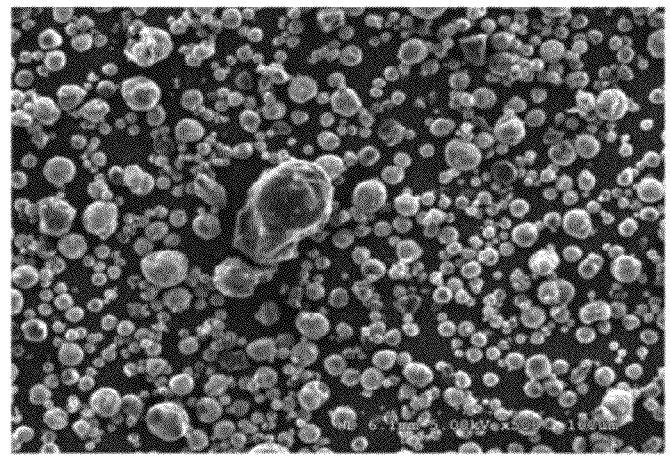
FIG. 4 is a scanning electron micrograph (SEM) image of the product of Example 4.
Figure 5:
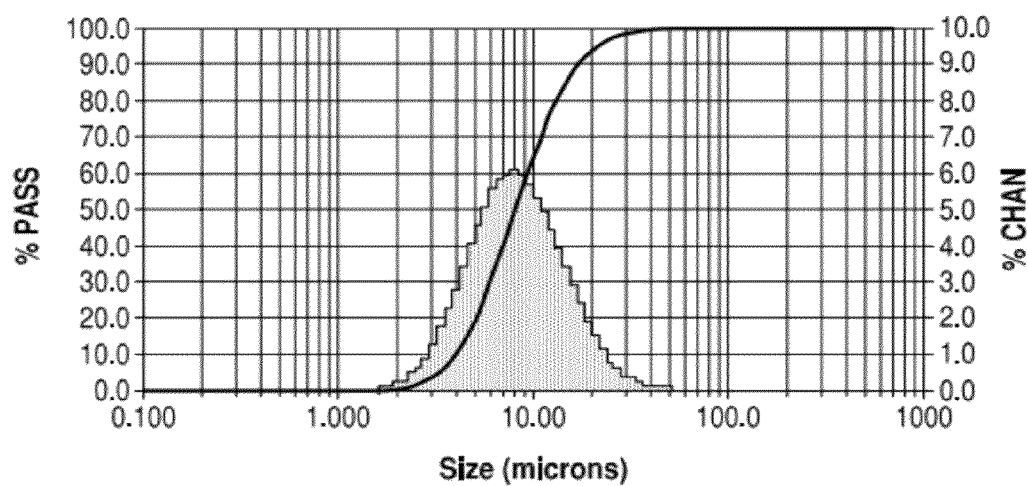
FIG. 5 is a graph indicating the particle size distribution of the product of Example 4.
Figure 6:
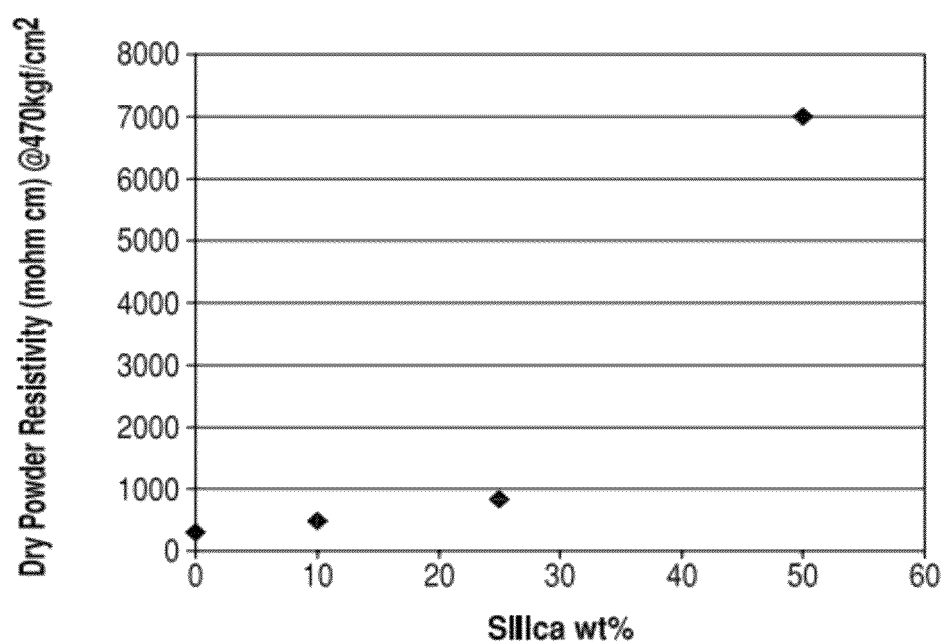
FIG. 6 is a graph of dry powder resistivity against silica weight percent in the carbon-silica products of Examples 1 to 4.

The carbon-silica composite particles employed herein can be produced by a variety of known techniques. For example, they can be made in a flame reactor, similar to that used to make carbon black; but with a silica feedstock being introduced into the reactor so to produce particles containing both carbon and silica domains within the same particle. Such a reactor is illustrated in FIG. 3 and includes a combustion zone 21, with a zone of converging diameter 22; a feedstock injection zone with restricted diameter 23; and a reaction zone 24. A hot combustion gas stream flows downstream from zones 21 and 22 into zones 23 and 24 to contact a carbon black feedstock 26, which is introduced at point 27 into the feedstock injection zone 23. Any carbon black feedstock can be used in the process, but petroleum refinery sources, such as decanted oils from catalytic cracking operations, as well as the by-products from coking operations and olefin manufacturing operations, are preferred.

The mixture of the carbon black feedstock and hot combustion gas flows downstream from the injection zone 23 to the reaction zone 24, where the feedstock is pyrolyzed to carbon black. The reaction is arrested by injecting a quenching fluid, generally water, into the stream of newly formed carbon black particles in a quench zone 28 located downstream of the reaction zone 24. The quench fluid serves to cool the carbon black particles and to reduce the temperature of the gaseous stream and decrease the pyrolysis rate. After the carbon black is quenched, the cooled gases and carbon black pass downstream into any conventional cooling and separating means whereby the carbon black is recovered. The separation of the carbon black from the gas stream is readily accomplished by conventional means such as a precipitator, cyclone separator, bag filter or other means known to those skilled in the art.

The composite particles employed herein may be produced by introducing a volatilizable silicon containing compound into the carbon black reactor at any point upstream of the quench zone. Suitable volatilizable silicon compounds include, but are not limited to, silicates such as tetraethoxy orthosilicate (TEOS) and tetramethoxy orthosilicate, silanes such as, tetrachloro silane, and trichloro methylsilane; and volatile silicone polymers such as octamethylcyclotetrasiloxane (OMTS). The volatilizable compound may be premixed with the carbon black-forming feedstock and introduced with the feedstock into the reactor at point 27 of the feedstock injection zone 23. Alternatively, the volatilizable compound may be introduced into the reactor separately from the feedstock injection point. Such introduction may be upstream or downstream from the feedstock injection point, provided the volatilizable compound is introduced upstream from the quench zone. For example, referring to FIG. 3, the volatilizable compound may be introduced at point 29 or any other point in the reaction zone 24.

Upon volatilization and exposure to high temperatures in the reactor, the silicon containing compound decomposes, and reacts with other species in the reaction zone, to produce a silica-containing carbon black, such that the silica becomes an intrinsic part of the carbon black. If the volatilizable compound is introduced into the reactor substantially simultaneously with the feedstock, the silica is distributed throughout at least a portion of the carbon black aggregate particle. On the other hand, if the volatilizable compound is introduced into the reactor at a point after carbon black formation has commenced but before the reaction stream has been subjected to the quench, composite particles are obtained in which silica is present primarily as a coating at the surface of the carbon black aggregate.

In another embodiment, silica-coated carbon black particles are produced by coating a silicon oxide compound onto already-formed carbon black particles, present in the form of a finely-dispersed slurry, particularly an aqueous slurry. The silica coating can be accomplished by bringing the carbon black slurry into contact with an acid solution and an inorganic silicon compound solution. Preferably, the acid solution is a sulfuric acid solution and the inorganic silicon compound solution is a sodium silicate solution. Alternatively, the silica coating can be produced by combining the carbon black slurry with a mixture of aqueous ammonia solution and ethanol and then adding dropwise to this combination a solution of an organosilicate such as tetraethylorthosilicate, or a silane such as tetraethoxysilane, in a solvent such as methanol. Silica precipitates out of the organosilicon-containing solution onto the carbon black particles in the slurry.

Alternatively, the carbon and silica composite particles employed herein can be produced by spray conversion. In this embodiment, graphite, carbon black or activated carbon particles are conveniently dispersed in a first carrier liquid, such as water, and the resulting dispersion is mixed with a dispersion of silica particles (colloidal silica, fumed silica or precipitated silica) in a second carrier liquid, such as water, miscible with the first carrier liquid.

The resultant mixture is then atomized to produce an aerosol comprising droplets of the mixture dispersed and suspended in a carrier gas. The droplets may be generated using any appropriate apparatus, including liquid atomizers, mist generators, nebulizers and aerosol generators. One suitable apparatus is an ultrasonic aerosol generator, in which ultrasonic energy is used to form or assist formation of the droplets. An example of an ultrasonic aerosol generator is a nozzle-type apparatus, with the nozzle being ultrasonically energized to aid in formation of droplets of a fine size and narrow size distribution. Another example of an ultrasonic aerosol generator ultrasonically energizes a reservoir of the precursor mixture, causing atomization cones to develop, from which droplets of the precursor mixture form, and are swept away by a flowing carrier gas. Reservoir-type ultrasonic aerosol generators can produce very small droplets of a relatively narrow size distribution and are preferred for use in applications when the final composite particles are desired to be in a range of from about 0.2 to about 5 microns (weight average particle size), and especially when a narrow size distribution of the particles is desired. An example of a reservoir-type ultrasonic aerosol generator is described, for example, in U.S. Pat. No. 6,338,809, the entire contents of which are incorporated by reference herein. Although both the nozzle-type ultrasonic aerosol generator and the reservoir-type ultrasonic aerosol generator produce small droplets of a relatively narrow size distribution, the reservoir-type generally produces finer droplets of a more uniform size.

Another example of an apparatus for generating droplets is a spray nozzle (not ultrasonically energized). Some examples of spray nozzles include 2-fluid nozzles, gas nozzles and liquid nozzles. Spray nozzle generators have an advantage of very high throughput compared to ultrasonic generators. Droplets produced using spray nozzles, however, tend to be much larger and to have a much wider size distribution than droplets produced by ultrasonic generators. Therefore, spray nozzles are preferred for making relatively large composite particles. Other types of droplet generators that may be used include rotary atomizers, and droplet generators that use expansion of a supercritical fluid or high pressure dissolved gas to provide the energy for droplet formation. Still another process for generating droplets is disclosed in U.S. Pat. No. 6,601,776, the entire contents of which are incorporated herein by reference.

The carrier gas used as the transport medium for the aerosol may be any convenient gas composition and may, for example, be a single component gas composition (such as for example pure nitrogen) or a mixture of multiple gas components (such as for example air, or a mixture of nitrogen and hydrogen). In addition, the carrier gas can be selected so as to be substantially non-reactive during the spray conversion process or alternatively may be selected so as to participate in, for example, the conversion of the silica precursor compound to silica during the spray conversion process.

After the aerosol is generated, the aerosol is heated in order to: (1) remove at least a portion of the liquid vehicle in the droplets and (2) convert the silica precursor compound to silica. Typically these processes are accomplished in a single step by heating the aerosol to a reaction temperature of not greater than 600° C., such as not greater than 500° C. (e.g., from about 300° C. to about 450° C. or from about 350° C. to about 300° C.) for a period of time of at least about 1 seconds, e.g., at least 3 second, at least about 20 seconds or at least about 100 seconds. Conveniently, the heating is conducted in a spray dryer, since spray dryers have the advantage of having high throughput, which allows large amounts of particles to be produced.

The product of the spray conversion step comprises carbon particles, typically having a number average primary particle size of from about 5 to about 50 nm and aggregate size of from 50 to 500 nm and silica particles, typically having a number average particle size of from about 2 to about 10 nm and an aggregate size of from 50 to 500 nm. The composite carbon/silica particles are generally agglomerated into substantially spherical, mesoporous agglomerates having a weight average particle size of about 2 to about 20 microns, for example about 3 to about 10 microns.

Where the present carbon-silica composite particles are produced from already-formed carbon particles, the latter can be modified before use to comprise surface organic groups comprising a) at least one aromatic group or a $C_1$ to $C_{12}$ alkyl group, and b) at least one ionic group and/or at least one ionizable group. Suitable ionic and/or ionizable groups include sulfate, sulfite, sulfonate and carboxylic acid groups. The production of such surface-modified carbon products is described in, for example, U.S. Pat. No. 5,885,335, the entire contents of which are incorporated herein by reference.

In some cases, it may be desirable to include in the carbon-silica composite particles described herein one or more other components of the expander mixture of the lead-acid battery negative electrode, such as one or both of the barium sulfate and the lignosulfonate. This can be achieved simultaneously with, or separately from, the production of the carbon/silica composite particles. For example, using the spray conversion technique described above, barium sulfate crystals can be added to an aqueous dispersion of carbon black and silica particles. Spray drying then results in spherical composite micron size agglomerate particles of carbon, silica and barium sulfate and having fixed porosity.

Alternatively, carbon-silica composite particles can be produced in an initial flame spraying operation and the resultant particles co-dispersed in water with barium sulfate crystals and/or lignosulfonate polymer. Spray drying to the co-dispersion again results in spherical composite micron size agglomerate particles of carbon, silica, barium sulfate and/or lignosulfonate with fixed porosity.

In another embodiment, carbon and silica aggregates can be dispersed in solvent and a soluble precursor to barium sulfate or barium oxide can be added to the precursor solution and the resultant mixture sprayed to form agglomerate composite particle where small barium sulfate or oxide nanoparticles are preferentially deposited onto the surface of the carbon particles.

In yet another embodiment, a lignosulfonate polymer can be dissolved in water and co-sprayed together with a dispersion of the other components (carbon and silica) to form modified carbon silica composite particles.

In addition, any of the above powders, but in particular carbon-silica composite particles (powders), can be pre mixed with barium sulfate and or lignosulfonate and pelletized by dry and wet pelletization processes to form 50 to 300 microns size pellets which are then easily and uniformly dispersed when the pellets are added to the negative battery paste formulation.

Irrespective of how they are produced, suitable composite particles of carbon, silica with barium sulfate and/or lignosulfonate polymer would contain sufficient barium sulfate and/or lignosulfonate polymer to provide 0.2-1% lignosulfonate and/or 0.2-1% barium sulfate when the composite particles are present in a negative battery plate paste in an amount of from about 0.2 to about 25 wt % relative to the lead oxide in the paste as described above.

The invention will now be more particularly described with reference to the following Examples.

EXAMPLES 1

Sprayed Dried Carbon Black 3333 g high surface area carbon black suspension (15 wt % carbon) is mixed with 9167 g water. The combined mixture is sheared for 15-20 minutes until the components are intimately mixed. The feed is then pumped to an atomization unit to form droplets and the droplets are entrained in a gas stream and sprayed into spray conversion equipment, such as a spray dryer. The spray dryer is operated with an inlet temperature of 585° C. and an outlet temperature of 320° C.

EXAMPLE 2

Sprayed Dried Carbon Black-Silica Composite (90:10 by Weight)

In one container, 3000 g high surface area carbon black suspension (15 wt % carbon) is mixed with 8250 g water. The combined mixture is sheared for 15-20 minutes until the components are intimately mixed.

In a separate container, 50 g fumed silica (Cab-O-Sil M5) is mixed with 1200 g water. The combined mixture is sheared for 15-20 minutes until the components are intimately mixed.

The silica dispersion is then added to the carbon black dispersion, and the resultant mixture is sheared for another 20 minutes. The feed is then pumped to an atomization unit to form droplets and the droplets are entrained in a gas stream and sprayed into spray conversion equipment, such as a spray dryer. The spray dryer is operated with an inlet temperature of 585° C. and an outlet temperature of 320° C.

EXAMPLE 3

Sprayed Dried Carbon Black-Silica Composite (75:25 by Weight)

In one container, 2500 g high surface area carbon black suspension (15 wt % carbon) is mixed with 6875 g water. The combined mixture is sheared for 15-20 minutes until the components are intimately mixed.

In a separate container, 125 g fumed silica (Cab-O-Sil M5) is mixed with 3000 g water. The combined mixture is sheared for 15-20 minutes until the components are intimately mixed.

The silica dispersion is then added to the carbon black dispersion, and the resultant mixture is sheared for another 20 minutes. The feed is then pumped to an atomization unit to form droplets and the droplets are entrained in a gas stream and sprayed into spray conversion equipment such as a spray dryer. The spray dryer is operated with an inlet temperature of 585° C. and an outlet temperature of 320° C.

EXAMPLE 4

Sprayed Dried Carbon Black-Silica Composite (50:50 by Weight)

In one container, 1667 g high surface area carbon black suspension (15 wt % carbon) is mixed with 4583 g water. The combined mixture is sheared for 15-20 minutes until the components are intimately mixed.

In a separate container, 250g fumed silica (Cab-O-Sil M5) is mixed with 6000 g water. The combined mixture is sheared for 15-20 minutes until the components are intimately mixed.

The silica dispersion is then added to the carbon black dispersion, and the resultant mixture is sheared for another 20 minutes. The feed is then pumped to an atomization unit to form droplets and the droplets are entrained in a gas stream and sprayed into spray conversion equipment such as a spray dryer. The spray dryer is operated with an inlet temperature of 585° C. and an outlet temperature of 320° C.

FIG. 1 shows SEM of the product of Example 4. Because the product is formed by heat treatment of liquid droplets, it is in the form of soft spherical agglomerates comprised of carbon black aggregates and silica aggregates. The average particle size (d50) of the agglomerates is about 4-6 μm (FIG. 2).

EXAMPLE 5

BET Surface Area

The BET surface area of the products of Examples 1 to 4 was measured by nitrogen adsorption method ASTM D3037-89 and the results are listed in Table 1. Because the surface area of the starting carbon black (ca. 1400 m$^2$/g) is significantly higher than that of fumed silica (ca. 200 m$^2$/g), the surface area of the composite decreases as the silica to carbon black (CB) ratio increases.

TABLE 1

| | Example | | | |
|---|---|---|---|---|
| | 1 | 2 | 3 | 4 |
| Composition | 100% CB | 90% CB + 10% silica | 75% CB + 25% silica | 50% CB + 50% silica |
| BET surface area (m$^2$/g) | 1160 | 1051 | 940 | 680 |

EXAMPLE 6

Dry Powder Resistivity

The dry powder resistivity of the products of Examples 1 to 4 was measured at a pressure of 470 kgf/cm$^2$ by a dry powder resistivity method described by A. Espinola et al., Carbon 24 (3), 337-341 (1986) and the results are plotted in FIG. 3. It will be seen that a significant and undesirable increase in resistivity is observed when silica wt. % in the carbon-silica particles increases from 25 to 50 wt. %. While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A paste suitable for a negative plate of a lead-acid battery, the paste comprising lead oxide and first composite particles comprising both carbon and silica domains within the same individual particles having an average size of between about 10 to about 20 nm.

2. The paste of claim 1, wherein the loading of said composite particles is from about 0.2 to about 25 wt % relative to the lead oxide.

3. The paste of claim 1, wherein the loading of said composite particles is from about 0.5 to about 10 wt % relative to the lead oxide.

4. The paste of claim 1, wherein the weight ratio of carbon to silica in said composite particles is from about 98:2 to about 50:50.

5. The paste of claim 1, wherein the weight ratio of carbon to silica in said composite particles is from about 95:5 to about 50:50.

6. The paste of claim 1, wherein the weight ratio of carbon to silica in said composite particles is from about 90:10 to about 75:25.

7. The paste of claim 1, wherein the paste further comprises second composite particles different from the first composite particles, the second composite particles comprising silica coated on surfaces of carbon particles.

8. The paste of claim 1, wherein the paste further comprises second composite particles different from the first composite particles, the second composite particles comprising agglomerates of carbon and silica aggregate particles.

9. The paste of claim 8, wherein the agglomerates have an average size between about 0.2 and about 10 microns.

10. The paste of claim 1, wherein the carbon comprises carbon black.

11. The paste of claim 10, wherein the carbon black has been modified to comprise surface sulfate or sulfonate groups.

12. The paste of claim 1 wherein the composite particles further include at least one of barium sulfate and a lignosulfonate.

13. A negative plate for a lead-acid battery produced from the paste of claim 1.

14. A lead-acid battery comprising a negative plate produced from the paste of claim 1.

15. The paste of claim 1, wherein the composite particles are generally agglomerated into substantially spherical, mesoporous agglomerates.

* * * * *